D. STEPHEN.
RUBBER FLOAT BALL VALVE.
APPLICATION FILED OCT. 24, 1913.

1,158,395.

Patented Oct. 26, 1915.

Witnesses
M. J. Lougden
Anna G. Smith

Inventor
David Stephen,
By G. W. Smith.
Attorney

UNITED STATES PATENT OFFICE.

DAVID STEPHEN, OF STRATFORD, CONNECTICUT, ASSIGNOR TO THE H. O. CANFIELD CO., OF BRIDGEPORT, CONNECTICUT, A CORPORATION OF CONNECTICUT.

RUBBER FLOAT BALL-VALVE.

1,158,395.     Specification of Letters Patent.     Patented Oct. 26, 1915.

Application filed October 24, 1913. Serial No. 797,096.

*To all whom it may concern:*

Be it known that I, DAVID STEPHEN, a citizen of the United States, residing in the town of Stratford, county of Fairfield, State of Connecticut, have invented certain new and useful Improvements in Rubber Float Ball-Valves; and I do declare the following to be a full, clear, and exact description of the invention, such as will enable others skilled in the art to which it appertains to make and use the same.

This invention relates to improvements in rubber float ball valves constructed in accordance with a companion application filed herewith entitled method of making float ball valves, Serial No. 797,095, filed October 24, 1913.

The object of the invention is to incorporate a rubber stiffening element in the ball so that collapsing thereof will be effectually prevented.

Further, the invention aims to provide reinforcing means for the metal thimble at the ball top, and to otherwise generally improve, simplify, and economize in the production of ball valves of the type above mentioned.

Figure 1:
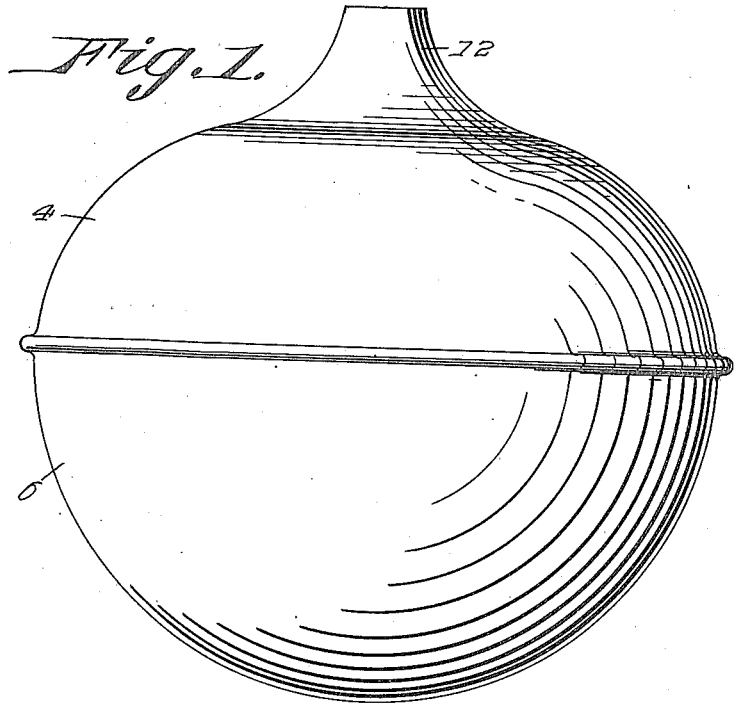

In the drawings: Figure 1 is a side elevation of a ball valve constructed in accordance with the present invention; and Fig. 2 is a sectional view thereof.

The method of manufacture of the float ball valve, briefly recited, is as follows:—A back piece of rubber 1, of substantially concavo-convex cross-section, is vulcanized to the proper degree of stiffness, a reinforcement 2 being provided which extends on the inner concave face of the rubber piece 1, the latter being preferably of substantially circular outline.

Figure 2:
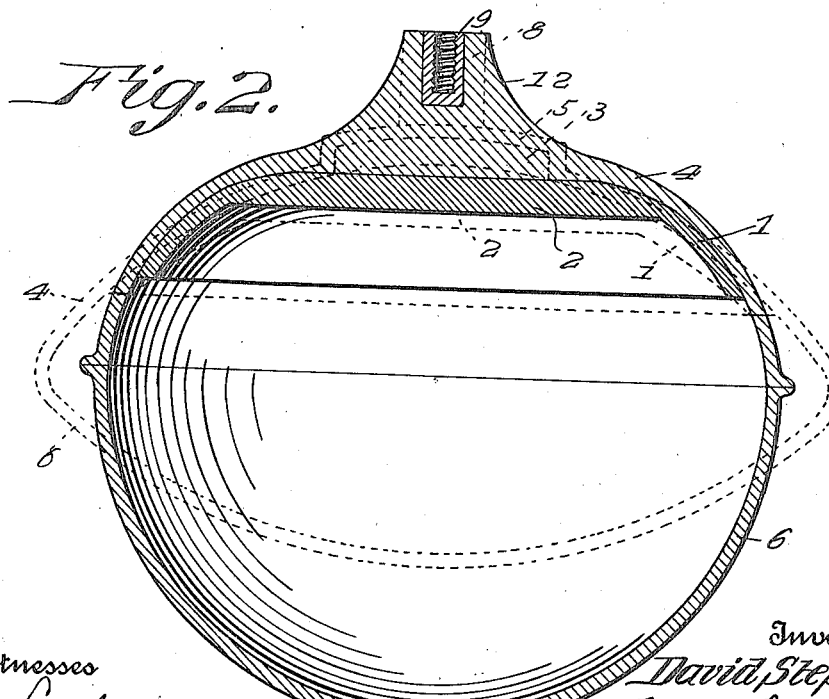

In Fig. 2 of the drawings, the dotted lines indicate the parts as constructed and assembled and in condition to be vulcanized, and the vulcanizing process produces the structure which is shown in full lines in Fig. 2, and also in Fig. 1. A small block 3 of unvulcanized rubber is centrally cemented to the upper or outer convex face of the rubber piece 1, whereupon a large unvulcanized rubber disk 4, which is to form the upper half of the ball, is placed over the small block 3, cement being first applied so as to effect adhesion between the piece of rubber 1 and the large rubber disk 4, the operator manually kneading the central portion of the disk 4 about the block 3 so that the large disk 4 will be provided with a swelling or protuberance 5 which incloses the small block 3. The next step is to unite the free edge of a comparatively large unvulcanized rubber disk 6, which is to form the lower half of the ball, to the peripheral edge of the disk 4, by manipulating and kneading the edges together. A nub 8 of unvulcanized rubber, containing an interiorly threaded metal thimble 9, is next cemented to the outer face of the protuberance 5, whereupon the operator inflates the structure to the form shown in dotted lines in Fig. 2 of the drawings and seals the structure so as to confine the air therein. The structure thus formed is then placed in a mold and vulcanized, and pierced at 11 to allow escape of the gases which the heat of vulcanization has caused to form in the structure. During the vulcanization process, the block 3, the protuberance 5 and the nub 8 will merge so as to form sufficient stock to provide the boss 12, which latter serves as a reinforce and also provides a firm and effective anchorage for the metal thimble 9.

An important feature of the present invention is the prevulcanizing of the back piece 1 so that it is of a degree of stiffness greater than would result were said piece vulcanized to the same extent as that to which the ball itself is vulcanized. If all the parts were primarily unvulcanized and the entire structure were vulcanized so that the back piece 1 would also be sufficiently vulcanized, then the ball would be too hard and would not seat and cushion in a satisfactory manner against the valve seat of the tank water supply. On the other hand, if all the parts were primarily unvulcanized and if the vulcanization were only carried to an extent sufficient to give the ball proper stiffness, then the piece 1 would not be possessed of sufficient rigidity or stiffness to prevent collapse of the ball, which latter objection prevails in most balls as now made. Therefore by prevulcanizing the piece 1, so that the vulcanizing of the other parts will not affect said piece 1, the latter possesses greater strength, rigidity and stiffness, which afford the desideratum of a stiffening element formed of rubber and incorporated in the ball as distinguished from a stiffening element formed of foreign material. In regard to the use of foreign material for the purpose of stiffening the crown of the ball, it may be said that metal and wood have been used for this purpose, in lieu of rubber, but this has proven objectionable, because a permanent or satisfactory connection with the rubber ball cannot be formed, and in addition the foreign material soon works loose, and in some cases disintegrates the rubber ball, aside from the item of expense which the use of foreign material involves in attachment.

What is claimed is:—

1. A hollow rubber float ball valve, of comparatively flexible material having an upper portion to which a stem for the valve may be attached, and a rubber reinforcing element of less flexible material than the hollow rubber upper portion, said element being shaped to fit within the upper portion and permanently secured thereto throughout its entire upper surface whereby the upper portion of the valve is reinforced to prevent distortion of the same.

2. A hollow rubber float valve, of comparatively flexible material having an upper portion to which a stem for the valve may be attached, and a rubber reinforcing element of less flexible material than the hollow rubber upper portion, said element being shaped to fit within the upper portion and permanently secured thereto throughout the entire upper surface of the reinforcing element, whereby the upper portion of the valve is reinforced to prevent distortion of the same.

3. A hollow valve, the main body and seating portion whereof are formed of flexible rubber, and a non-metallic stiffening member, possessing a less degree of flexibility than the body portion, located within, surrounded by, and permanently united to the inner face of the upper portion of the valve, the valve being characterized by having a yielding and adaptable seat, and an upper portion protected against collapse under external pressure.

4. A bulb for tank valves, having a continuous outer surface of soft vulcanized rubber and an upper inner portion forming a rigid support, the lower hemispherical portion being entirely of soft vulcanized rubber and all of said parts being vulcanized to each other.

5. A hollow rubber float ball valve having an upper portion to which a stem for a valve may be attached and comprising comparatively flexible material, and a rubber reinforcing element of less flexible material than the hollow upper portion, said element being shaped to fit within the upper portion, and permanently secured thereto throughout its entire upper surface, whereby the upper portion of the valve is reinforced to prevent distortion of the same.

6. A float ball valve formed with a flexible seat-engaging portion, an upper portion, and an interiorly arranged non-metallic stiffening element for said upper portion having its upper surface permanently secured to the inner surface of said upper portion.

In testimony whereof I affix my signature in presence of two witnesses.

DAVID STEPHEN.

Witnesses:
G. E. MELIUS,
H. A. MAYSE.